(12) United States Patent  
Larue (10) Patent No.: US 8,128,047 B1
(45) Date of Patent: Mar. 6, 2012

(54) CLAMP MECHANISM FOR ACCESSORY MOUNTS

(76) Inventor: Mark C. Larue, Leander, TX (US)

(*) Notice: Subject to any disclaimer, the term of this patent is extended or adjusted under 35 U.S.C. 154(b) by 0 days.

(21) Appl. No.: 12/807,295

(22) Filed: Sep. 1, 2010

(51) Int. Cl.
A47G 1/10 (2006.01)

(52) U.S. Cl. ...................... 248/316.1; 248/544

(58) Field of Classification Search ............. 248/316.1, 248/316.4, 316.6, 316.8, 544, 220.21, 226.11; 42/124
See application file for complete search history.

(56) References Cited

U.S. PATENT DOCUMENTS

| | | | | |
|---|---|---|---|---|
| 5,765,902 A * | 6/1998 | Love | .................. | 296/100.01 |
| 5,787,630 A * | 8/1998 | Martel | .................. | 42/125 |
| 6,644,614 B1 * | 11/2003 | Chen | .................. | 248/316.1 |
| 2003/0154641 A1 * | 8/2003 | Stover | .................. | 42/124 |
| 2011/0023348 A1 * | 2/2011 | Karagias | .................. | 42/124 |

* cited by examiner

Primary Examiner — Ramon Ramirez
(74) Attorney, Agent, or Firm — James L. Jackson (57) ABSTRACT

A mounting base mechanism for releasably securing an accessory device to a mechanical structure having opposed oppositely angulated clamp surfaces. The mounting base mechanism defines a first clamp surface having clamping engagement with one of the angulated clamp surfaces. A clamp support structure projects laterally from the mounting base mechanism and provides support for a clamp actuating mechanism having a clamping plate. A retainer device supported by the clamp support structure is operative to move the clamping plate substantially linearly for clamping engagement of the clamp plate with the other of the oppositely angulated clamp surfaces. A keeper member prevents inadvertent separation of the retainer and clamping plate from the clamp support structure.

20 Claims, 5 Drawing Sheets

CLAMP MECHANISM FOR ACCESSORY MOUNTS

BACKGROUND OF THE INVENTION

1. Field of the Invention

The present invention relates generally to a clamp mechanism for quickly and efficiently mounting a device to a support for the device. More particularly the present invention concerns a clamp mechanism for releasably securing firearm accessory mount for mounting accessories to the mounting rail of a firearm, generally a tactical rifle. More particularly the present invention concerns a clamp mechanism being in assembly with an accessory mount base and being adapted for releasably securing the mount base to a device such as a shoulder fired firearm.

2. Description of the Prior Art

It is often desired to provide for attachment and support of an accessory device to a supporting object. In the field concerning firearms accessories including optical sighting devices, manual sighting devices, light emitting devices are often mounted to all types of firearm to enhance the firearm sighting capability of a user. In the fields of photography and astronomical observation, cameras, lenses and telescopes are often attached to mounts or supports such as tripods, monopods and the like by means of clamping mechanisms to accommodate the need for assembly and disassembly during field conditions. In most cases a mount device is provided having a mounting rail and various types of clamping devices are often employed to secure an accessory device to the mount.

In the field of firearms, particularly shoulder fired firearms, accessory devices have historically been mounted to the receiver of a firearm by means of mounting screws. This is typically referred to as a permanent mount since the accessory will typically remain in assembly with the firearm until the firearm or the accessory needs replacement or repair. A number of quick release type mount clamping systems have been developed which permit an accessory to be quickly assembled to or removed from a firearm. These quick-release mounting systems are quite effective; however they are quite expensive to manufacture and purchase for use and are often subject to a significant degree of wear and tear during use.

It is desirable to provide an accessory mount and clamp mechanism that is significantly less expensive for users but which permits users to remove and replace various accessories, even during field conditions through the use of simple and efficient tools. It is also desirable to provide users with the capability of easily visualize the clamping force that is being applied so that the user can increase, decrease or repeatedly employ substantially the same clamping force each time an accessory is removed and replaced. This is especially important in the field of firearms where sighting devices can be removed from the mounting rail of a firearm and re-installed in a manner causing the sighting device to return to its pre-set zero.

SUMMARY OF THE INVENTION

It is a principal feature of the present invention to provide a novel accessory mount and clamp mechanism for firearm accessory mounts and for mounting accessories to other apparatus, such as cameras, camera lenses, spotting telescopes, astronomical telescopes and the like.

It is another feature of the present invention to provide a novel accessory mount and clamp mechanism which facilitates assembly or disassembly of an accessory support mount from a mounting rail of a supporting device, even in poor light conditions or other field conditions without risk of separating and losing necessary components of the clamp mechanism.

It is also a feature of the present invention to provide a novel accessory mount and clamp mechanism incorporating indicia that can be visualized by the user to identify the tightness of the clamping force of the clamp mechanism so that the same amount of clamping force can be applied each time the accessory mount and clamp mechanism is applied to a mount rail of a supporting device.

Briefly, the various objects and features of the present invention are realized by a clamp actuated accessory mounting system that is designed particularly for mounting various accessories, such as optical sighting devices, to mounting rails such as Picatinny rails, Weaver rails or other similar mounting base rail systems for firearms, photography equipment astronomy telescopes and the like. The present invention incorporates a clamp base structure having a portion that is configured for retained engagement with elongate tapered and undercut surfaces of a mounting rail. The clamp base structure defines one or more laterally projecting clamp platforms or supports each defining an opening forming a clamp actuator receptacle.

A hardened bushing member is seated within the clamp actuator receptacle and defines an opening within which a tapered centering portion of a clamp member is received. A clamp bolt is threaded into an internally threaded section of the clamp member and is tightened to move the clamp member to its force transmitting clamping position with the mounting rail. The clamp member defines an elongate clamping section having a tapered clamping surface that is disposed for force transmitting engagement with an undercut clamping surface of the rail member.

To ensure that the clamp mechanism remains in loose but secure assembly when the clamp bolt is completely unthreaded and loosened and to prevent any of the clamping components from becoming separated from the mounting base and possibly lost, the clamp member defines a keeper pocket and the clamp bolt defines a keeper slot. A keeper member, such as a split washer is seated within the keeper slot of the clamp bolt and is positioned within the keeper pocket of the clamp member. The shank of the clamp bolt has a length equal to or less than the depth of the keeper pocket so that at all conditions of the clamp mechanism the keeper member is located within the keeper pocket and cannot be easily displaced from the keeper slot. The mount base structure has one or more locator elements that is received within one of the multiple positioning slots of the accessory mounting rail. The base structures each receive a self-centering and self-aligning tube mounting ring for retaining the tube of an optical sighting device or engaging a circular portion of any supported device.

To provide a light weight accessory mount mechanism, such as for firearms, the mounting base and the support rings of the sight mounting system may be composed of a lightweight material such an aluminum alloy, hard polymer material or the like. Preferably, however, the mounting base is machined from steel material such as stainless steel which is noted for its strength, durability and resistance to weather conditions. The mounting base is drilled or otherwise formed to eliminate material and reduce the weight thereof. Since the light weight material are often quite soft and easily yielded by application of forces, hardened metal inserts composed of stainless steel, steel or other suitable hard materials are press-fitted or otherwise seated in appropriate openings or receptacles of the mount structure. These inserts are typically threaded so as to have threaded engagement with retainer elements such as Torx or Allen screws. If desired however, the inserts may simply be press fitted within insert receptacles and/or may be seated on internal seat shoulders if forces are not present that tend to remove the insert from its receptacle

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings.

DETAILED DESCRIPTION OF PREFERRED EMBODIMENT

Figure 1:
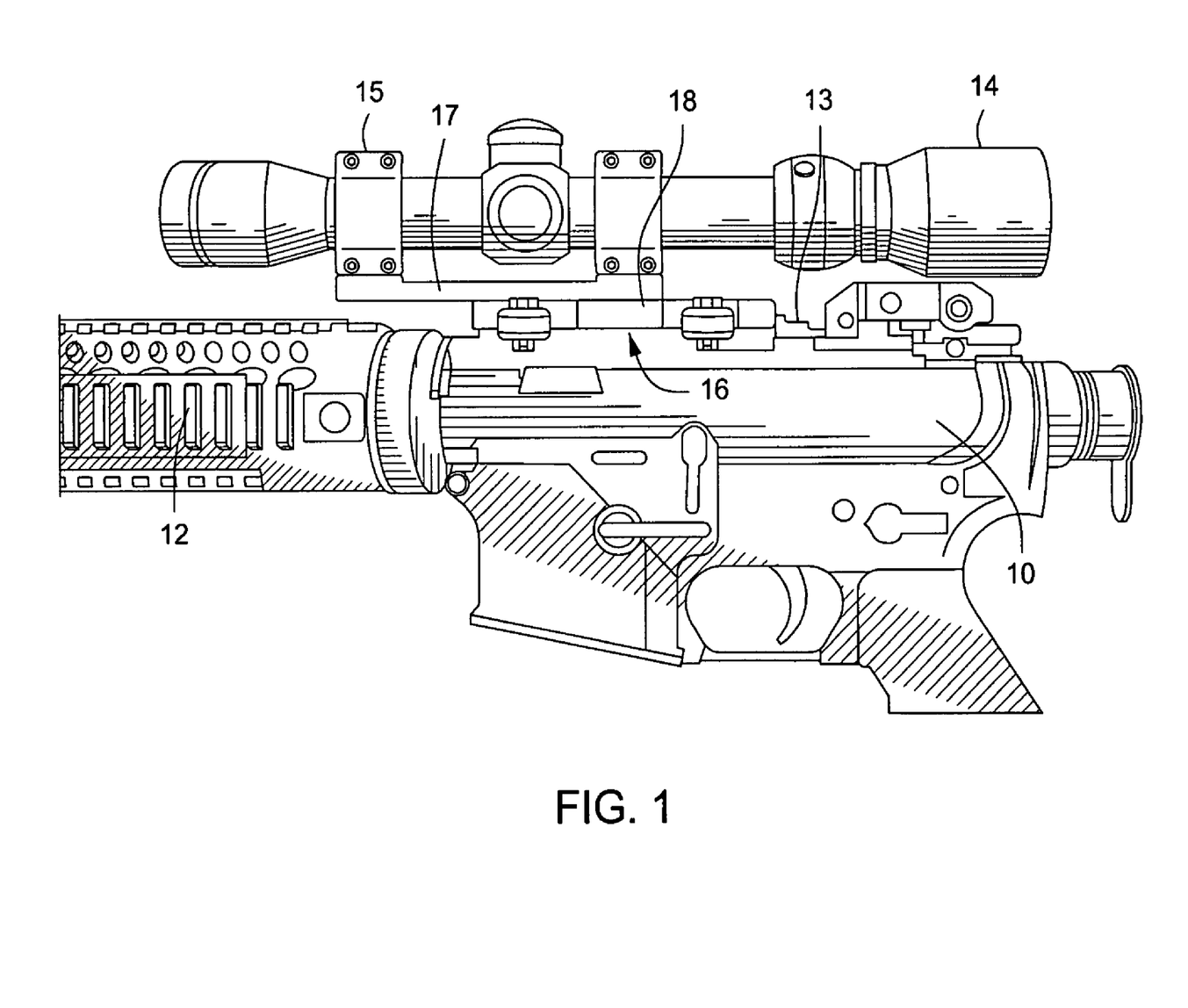
FIG. 1 is an elevation view showing a part of a tactical firearm having an accessory mounting rail and having an accessory mount embodying the principles of the present invention mounted thereto and supporting an optical sighting device.

Referring now to the drawings and first to FIG. 1, the receiver 10 and handguard 12 components of a shoulder fired tactical firearm are shown. The receiver 10 is provided with an accessory mount rail 13 which may be attached to the receiver 12 or incorporated as an integral component of the receiver. An optical sighting device 14 is shown to be supported by mount ring members 15 which are in turn supported by a mount and clamp mechanism, shown generally at 16, which embodies the principles of the present invention. The mount and clamp mechanism 16 included a partially cantilevered mount ring support section 17 that can be integral with a mount base 18 or can be mounted to and removed from the mount base as suits the needs of the manufacturer or user.

The firearm is provided with an accessory mount rail 13 that is affixed to or is an integral part of the receiver 12. As shown in FIG. 1 the accessory mount rail 13 is integral with the structure of the receiver 12. According to the present invention it is intended that the mount base 18 be capable of being mounted to the accessory mount rail 13 of the receiver and that it also be capable of being removed from the accessory mount rail as desired, such as for use of the firearm with a conventional rear sight device, typically called an iron sight. It is also desirable that the mount base 18 be capable of being re-installed on the accessory mount rail 13 in a manner that ensures that the optical sighting device is returned to the precise position of its pre-established zero so that accurate aiming of the firearm is accomplished without necessitating additional sighting adjustments.

Figure 2:
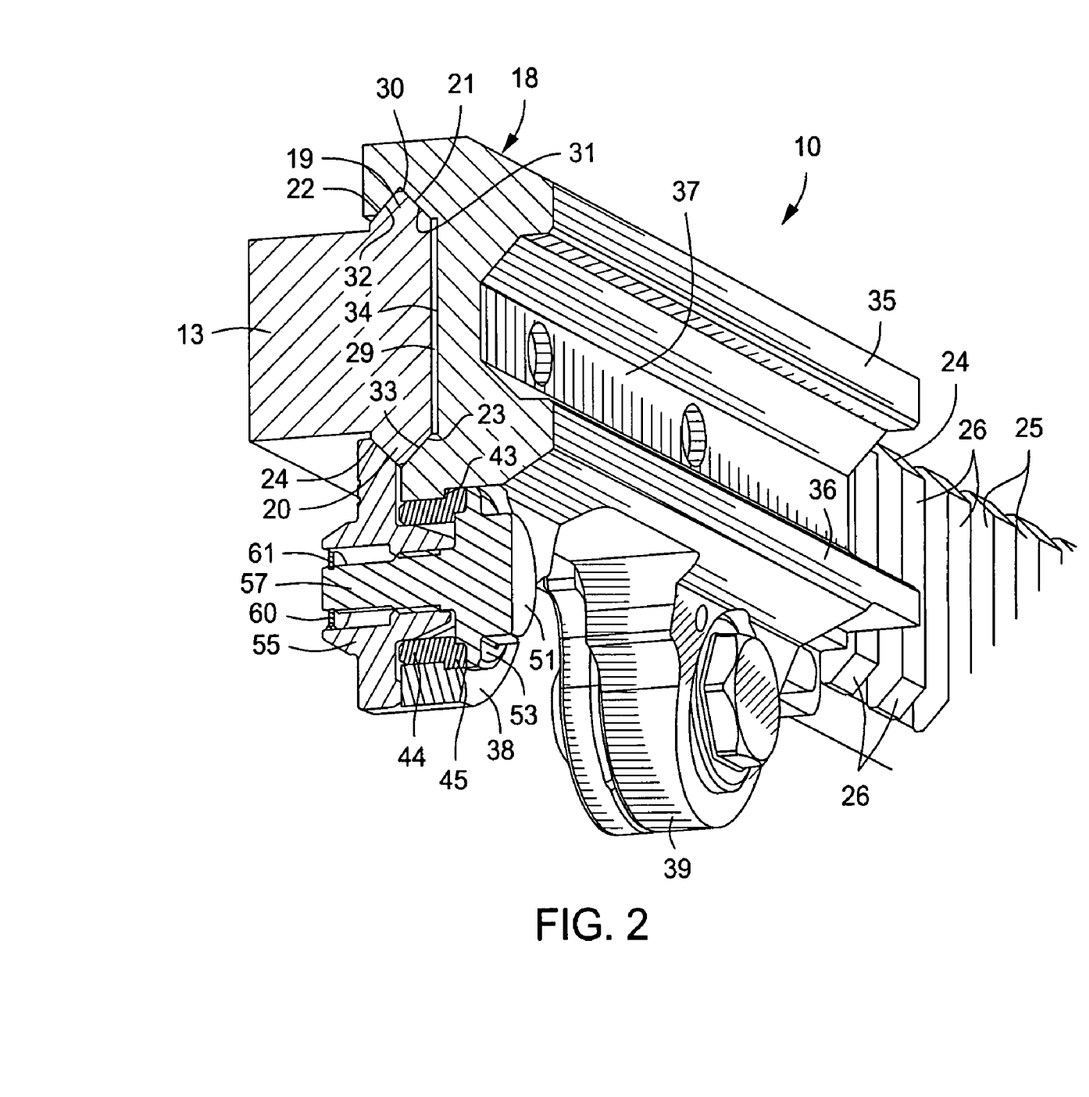
FIG. 2 is an isometric illustration showing the top and side portions of an accessory mount and clamp mechanism being engaged with a mount rail structure being constructed according to the principles of the present invention and having a part thereof cut away and shown in section.
Figure 3:
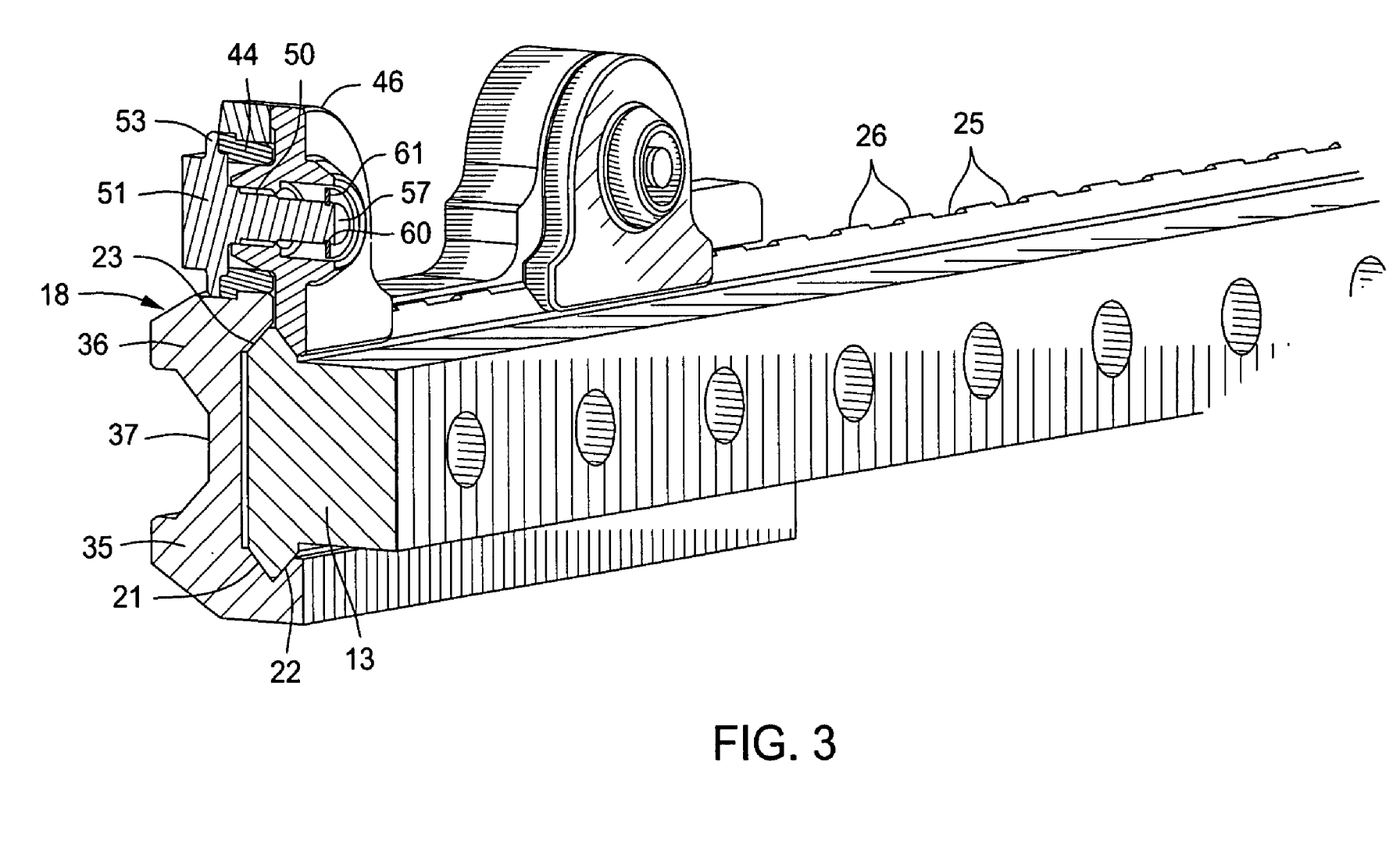
FIG. 3 is an isometric illustration of the bottom and side portions of the accessory mount and clamp mechanism of FIG. 1 and showing the clamp mechanism thereof in greater detail.

The accessory mount rail 13, as shown in detail FIG. 2 may conveniently take the form of a Picatinny rail, Weaver rail or other similar mount rail system for firearms. The accessory mount rail 13 may also take the form of a mount rail that is specifically designed for supporting photography equipment, astronomy telescopes and the like or for supporting other devices in a manner permitting the devices to be attached to and removed from a supporting structure as desired. Thus, while the present invention is particularly described as it relates to accessory mounting systems for firearms, it is not intended to limit the spirit and scope of the present invention solely to firearm related accessories.

Figure 4:
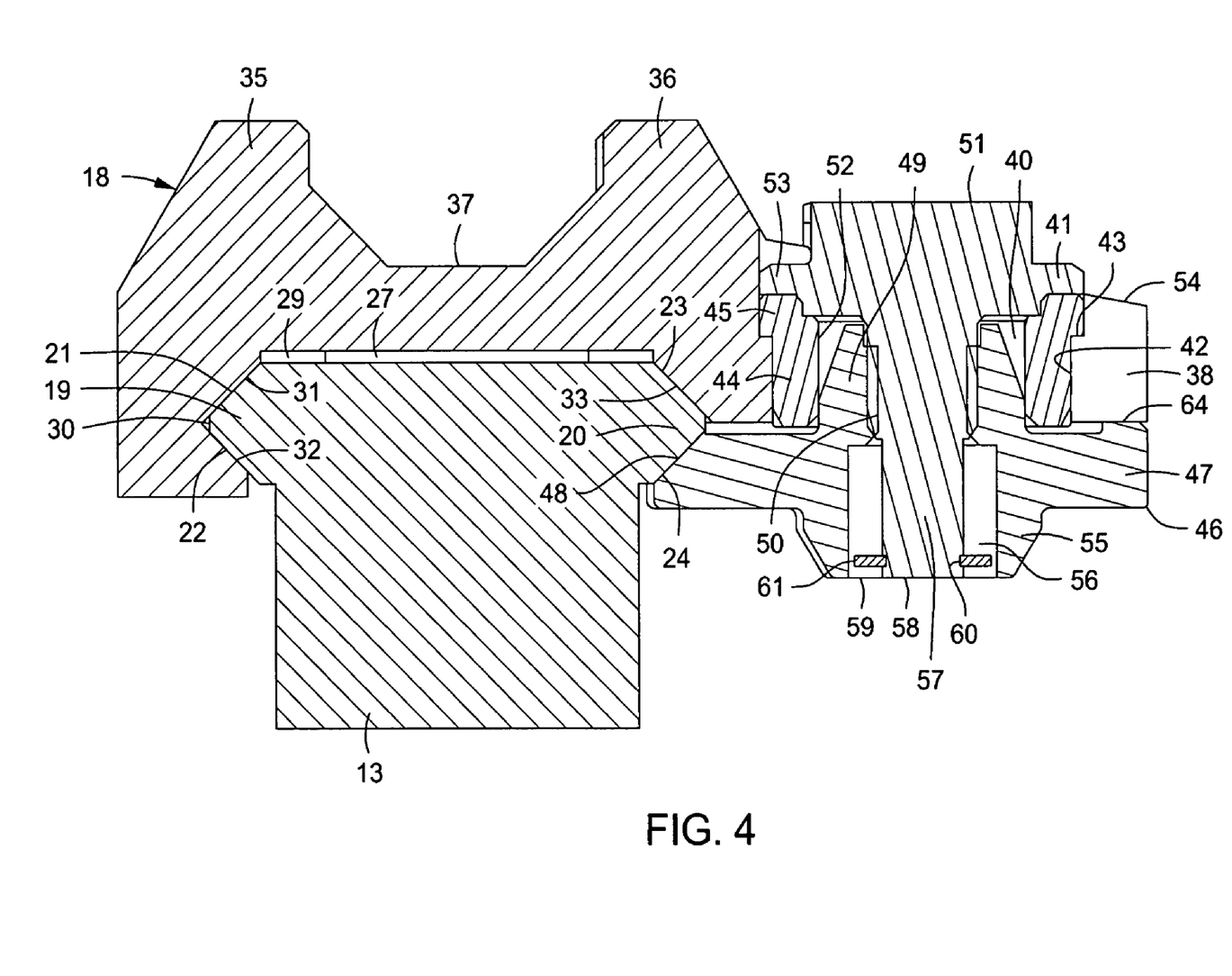
FIG. 4 is an end elevation view of the accessory mount and clamp mechanism of FIGS. 1 and 2 and further emphasizing the detailed construction of the clamp mechanism.

The accessory mount rail 13 is typically provided in the form of an elongate structure of any desired length and defines opposed elongate projections 19 and 20. The elongate projection 19 is formed by oppositely inclined clamping surfaces 21 and 22 while the elongate projection 20 is defined by oppositely angulated clamping surfaces 23 and 24. The upper portions of each of the elongate projections 19 and 20 are segmented by substantially equally spaced transverse slots 25 that are milled or otherwise formed. Substantially equally spaced transverse lands 26 remain when the milled slots are formed. These equally spaced transverse slots and lands establish a multiplicity of accessory location key receptacles within which are selectively received a pair of equally spaced location keys 27 and 28 that project from the underside of the mount base structure 18 as shown in FIG. 4.

The accessory mount and clamp mechanism 16 incorporates a mount base shown generally at 18 which can have one or more clamping mechanisms as desired. With reference to the FIGS. an accessory mount and clamp mechanism is shown having two substantially identical clamping mechanisms, but it is not intended to limit the spirit and scope of the present invention to the number of clamping mechanisms that are shown in the FIGS., it being understood that the mount base 18 may have one, two or more clamping mechanisms depending on the needs and desires of the user. The mount base 18 is typically of elongate configuration as shown particularly in FIGS. 1 and 5 and defines an elongate rail receiving groove 29 within which the laterally extending elongate projections 19 and 20 and the spaced lands and grooves of the mount rail 13 are received. One side portion of the mount base 18 defines an elongate clamp groove 30 which is defined by oppositely angulated internal groove surfaces 31 and 32. On the opposite side of the mount base 18 an elongate angulated clamp surface 33 is also defined, the angulation of the clamp surface 33 relative to an inner generally planar surface 34 of the elongate rail receiving groove 29 being substantially the same, but of opposite inclination as compared with the angulated internal groove surface 33.

The upper portion of the mount base 18 can have any of a number of differing configurations as is deemed appropriate for support of an accessory device such as an optical sighting device, laser sighting device, light transmitting device, etc. The mount base 18 may have elongate side ribs or ridges 35 and 36 defining a central groove 37 as shown in FIG. 2, thus providing support for any type of accessory device. Alternatively, the mount base 18 may define upstanding ring mount projections to permit mount ring members 15 to be secured thereto in the manner that is shown in FIG. 1. A wide range of other mount base configurations may be employed as well for supporting a wide range of accessory devices on the receiver 10, handguard 12 or on other parts of the firearm mechanism where mount rail structures may be provided.

To provide for clamping attachment of the mount base 18 to the mount rail 13, at least one and, if desired, two or more clamp mechanisms are provided as shown in detail in FIGS. 1, 2 and 3-5. The mount base member 18 defines one or more laterally projecting substantially identical clamp support platforms as shown at 38 and 39. As is evident by the section views of FIGS. 2, 3 and 4, each of the clamp support platforms 38 and 39 define receptacles 40 that are defined in part by internal cylindrical surfaces 41 and 42 and by an annular shoulder surface 43. A hardened insert 44 is positioned within the receptacle 40 and has an external enlarged portion 45 that is seated on the annular shoulder 43. The hardened insert 44 is preferably press-fitted within the receptacle 40 though it may be retained within the receptacle by threaded retention or by any suitable means.

A clamp member 46 defines a clamp plate structure 47 having an elongate tapered clamp surface 48 that is disposed for surface-to-surface clamping engagement with the tapered clamping surface segments 24 of the mount rail structure 13. The clamp member 46 defines an internally threaded clamp alignment projection or extension 49 that in the clamping position of the clamp member extends into the chamber 40 and is aligned by the internal surface 52 of the hardened insert. The clamp alignment projection or extension 49 receives the externally threaded shank 50 of a clamp retainer bolt or screw 51 and is drawn into a receptacle of the insert 44 that is defined by the inner surface 52 of the insert upon tightening rotation of the bolt member 51. The bolt member is a hex-head flanged bolt or screw having an annular flange 53 that is of a dimension for engagement with the upper surface portion of the hardened insert 44.

Figure 6:
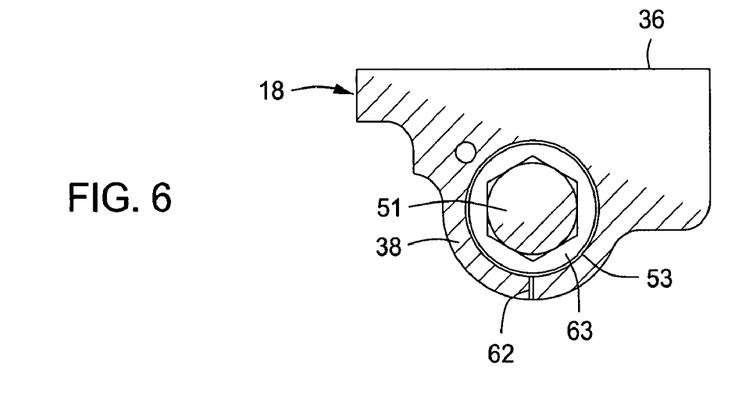
FIG. 6 is a partial plan view of the accessory mount and clamp mechanism of FIGS. 1-5 showing the indicia markings on the clamp support platform and on the flange of the clamping bolt or screw.

As the bolt or screw 51 is rotated in the tightening direction, i.e., clockwise, the clamp member 46 is drawn toward the head of the bolt or screw 51 and a boss 64 on the clamp plate 47, shown in FIG. 4, reacts with the clamp support platform 38 and causes an essentially pivotal activity to occur that forces the elongate tapered clamp surface 48 into force transmitting engagement with the tapered clamping surface segments 24 of the mount rail structure 13. The upper surface 54 of the clamp support platform 38 and the flange member 53 of the bolt or screw 51 are marked with indicia, as shown in FIG. 6, to identify the tightness or magnitude of the clamping force that is applied by the clamping bolt or screw to the clamp member 46. The indicia may include a reference mark 62 that is etched, printed or otherwise formed on the clamp support platform 38 and a plurality of evenly spaced bolt or screw position marks 63 that are etched, printed or otherwise formed on the flange 53 of the bolt or screw member 51. The bolt or screw position marks may have different lengths to enable the user to specifically identify the tightness setting of the clamp mechanism by visual inspection.

In the event the clamp mechanism is being loosened during conditions of poor visibility, such as at night when a firearm or astronomical telescope is being used, it might be possible that the bolt or screw 51 could become completely unthreaded from the internally threaded portion of the clamp member. Should this condition occur it is likely that one or more components of the clamp mechanism could become lost.

To prevent this condition from occurring, the design of the clamp mechanism of the present invention prevents complete separation of the components from the platform structure. The clamp member 46 defines a retainer projection 55 that has an elongate internal chamber or receptacle 56 therein. The bolt or screw member 51 defines an elongate non-threaded shank portion 57 that is of sufficient length to extend substantially the complete length of the elongate internal chamber or receptacle 56 when the clamp member is in clamping engagement with the clamp surface 24. This feature causes the end portion 58 of the bolt shank 57 to be located at or near the opening 59 of the elongate internal chamber or receptacle 56 as shown in FIG. 4 when the clamp mechanism is tightened. In this position the keeper member 61 cannot be inadvertently contacted and disengaged from its keeper groove 60. The end portion of the shank 57 of the bolt or screw 51 defines a keeper groove 60 within which is seated a keeper member 61 such as a split washer that is composed of spring material. The keeper member 61 is of a dimension so that the keeper member is located within the receptacle 56 when the clamp mechanism is tightened and when the clamp mechanism is completely loosened.

As the bolt or screw is rotated counter-clockwise from the position shown in FIG. 4, the threaded shank of the bolt moves upwardly relative to the clamp member 46, thus moving the keeper member upwardly within the elongate internal chamber or receptacle 56. The threaded section of the shank of the bolt is of less length than the length of the elongate internal chamber or receptacle 56, thus permitting complete separation of the threads of the bolt shank and the internal threads of the clamp member 46. The keeper member 61 prevents complete separation of the bolt or screw 51 from the clamp member 46 even when the threads of the bolt or screw and the clamp member have become completely disengaged, thus preventing any of the components of the clamp mechanism from becoming separated and potentially lost. This feature is especially beneficial when an accessory is being assembled to the mount rail or removed from the mount rail under conditions of poor light or conditions where components could easily be dropped and lost.

Figure 5:
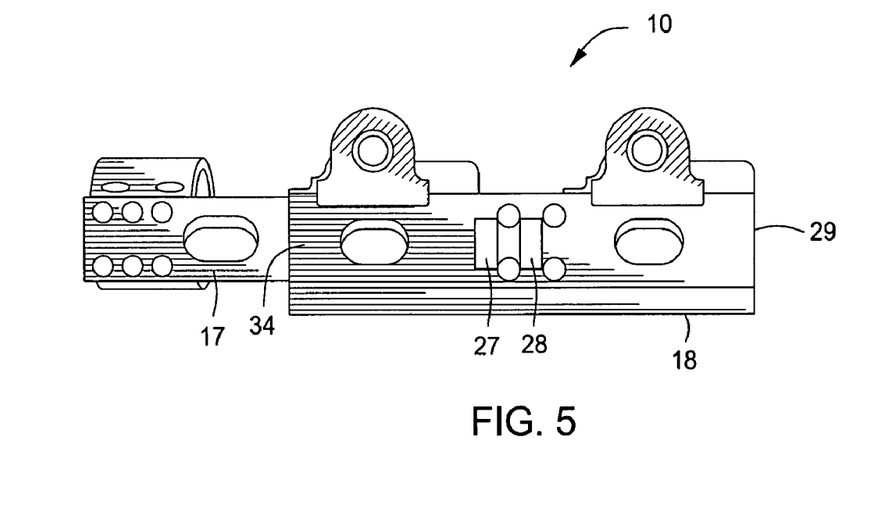
FIG. 5 is a bottom view of the accessory mount base structure showing the locator keys that project therefrom and further showing the structural details of the mount base and clamp mechanisms.

When the threads of the bolt and clamp members are completely disengaged and it is desired to activate the clamp mechanism and attach an accessory to the mount rail 13 the mount base 18, to which an accessory such as a telescope or other sighting device is mounted, is positioned with the elongate projection 19 of the mount rail 13 engaged within the elongate undercut clamp groove 30. From this initial position the mount base member 18 is pivotally moved within the elongate undercut clamp groove 30 until the elongate angulated clamp surface 33 is positioned in substantially surface-to-surface engagement with the angulated clamping surface 23 of the mount rail 13. This pivotal mount base assembly movement can occur only when the spaced location keys 27 and 28, shown in the bottom view of FIG. 5, are aligned with and enter into selected spaced transverse positioning slots of the mount rail 13.

With the mount base 18 positioned in clamping assembly with the mount rail 13, the clamp member is positioned with its internally threaded extension 49 engaged within the receptacle 40 and within the receptacle that is defined by the inner surface 52 of the hardened insert member 44. At this point the tapered elongate clamping surface 48 of the clamp plate member 47 will be in surface-to-surface engagement with the tapered clamping surface 24 of the elongate projection 20 of the mount rail 13. A tool is then engaged with the head of the bolt or screw member 51 and is used to rotate the bolt or screw member clockwise to cause the threaded connection of the bolt and the clamp member to be made up. If the bolt or screw 51 has a hex-head the tool can be a box or open end wrench. The bolt or screw can be provided with other bolt actuating geometry if desired, such as a Torx receptacle or hex receptacle for actuation of the bolt by means of a Torx wrench or Allen wrench.

During tightening rotation of the bolt or screw 51, as the threads of the bolt shank 57 and the clamp member 46 are made up, the keeper member 61 will be moved downwardly within the elongate internal chamber or receptacle 56 until at the tight position of the clamp member the keeper member will be located at or near the opening 59 of the receptacle 56 as shown in FIG. 4 Thus, when the clamp member is tightened to positively secure the base mount and accessory to the mount rail 13 the keeper member is protected within the receptacle 56 and In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. An accessory clamp mechanism for releasably securing an accessory mount base to a mount rail having first and second clamp surfaces, comprising:
    a mount base member having a base clamp surface disposed for retaining engagement with the first clamp surface of said mount rail;
    a clamp support member being fixed to and projecting laterally from said mount base member and defining a retainer opening;
    a clamp member having a clamping portion disposed for clamping engagement with the second clamp surface of said mount rail and having a retainer portion disposed in alignment with said retainer opening of said clamp support member; and
    a clamp retainer member extending through the retainer opening and having adjusting engagement with said clamp member, said clamp retainer member having adjusting movement generating force transmitting relation with said clamp member and adjustably moving said clamping portion of said clamp member substantially linearly into clamping engagement with the second clamp surface of said mount rail.

2. The accessory clamp mechanism of claim 1, comprising:
    a keeper member engaging said clamp retainer member and preventing separation of said clamp retainer member and said clamp member from said retainer opening of said clamp support member.

3. The accessory clamp mechanism of claim 1, comprising:
    a clamp alignment receptacle being defined within said retainer opening of said clamp support member; and
    a clamp alignment projection being defined by said clamp member and being received within said clamp alignment receptacle and establishing predetermined alignment of said clamp member with respect to said clamp support member and said clamp base member.

4. The accessory clamp mechanism of claim 3, comprising:
    said keeper member being located within said clamp alignment receptacle at all relative positions of said clamp member and said clamp retainer member.

5. The accessory clamp mechanism of claim 4, comprising:
    said keeper member having engagement with said clamp retainer member and said clamp support member.

6. The accessory clamp mechanism of claim 1, comprising:
    said clamp retainer member being adjustable relative to said clamp support member and said clamp member and adjusting the clamping force of said clamp member with the second clamp surface.

7. The accessory clamp mechanism of claim 6, comprising:
    adjustment indicia being defined by said clamp retainer member and said clamp support member and permitting selective adjustment of said clamp retainer member to achieve selective clamping force of said clamp member with the second clamp surface.

8. The accessory clamp mechanism of claim 1, comprising:
    said clamp retainer member being a threaded bolt;
    said clamp member being internally threaded and receiving said threaded bolt in threaded engagement therein;
    said clamp support member defining a clamp alignment receptacle therein; and
    said clamp member defining an alignment projection being received within said clamp alignment receptacle.

9. The accessory clamp mechanism of claim 8, comprising:
    said clamp member defining a keeper receptacle;
    a keeper member being mounted to said threaded bolt member and being located within said keeper receptacle during all conditions of said clamp member with respect to said clamp support member, said keeper member preventing separation of said clamp member and said threaded bolt member.

10. The accessory clamp mechanism of claim 1, comprising:
    said retainer member being a threaded bolt member having threaded engagement with said clamp member and defining a keeper groove; and
    said keeper member being a split washer member engaged within said keeper groove.

11. The accessory clamp mechanism of claim 1, comprising:
    said mount rail having first and second opposed projections each having oppositely tapered clamping surfaces;
    said mount base member defining an elongate clamp groove receiving said first of said opposed projections of said mount rail;
    said clamp support member being a clamp support platform integral with and projecting laterally from said mount base member and defining a clamp receptacle;
    a clamp member engaging said clamp support platform and having a tapered clamp surface disposed in clamping engagement with a tapered clamping surface of said second of said opposed projections of said mount rail; and
    said clamp retainer bolt member being threadedly engaged with said clamp member and being rotatable to apply clamping force to said clamp member and apply clamping force of said tapered clamp surface of said clamp member to said tapered clamp surface of said second projection.

12. An accessory clamp mechanism for releasably securing an accessory mount base to an object, comprising:
    a mount rail having first and second lateral rail projections each having oppositely tapered upper and lower clamp surfaces;
    a mount base member having oppositely tapered internal clamp surfaces defining a clamp groove receiving said first lateral rail projection therein, said mount base member having a tapered internal clamp surface having surface to surface engagement with said upper tapered upper clamp surface of said second lateral rail projection;

a clamp support member projecting laterally from said mount base member and defining a retainer opening;

a clamp member having a tapered clamping surface having clamping engagement with said lower clamp surface of said second lateral rail projection; and a clamp retainer member extending through the retainer opening and having force transmitting engagement with said clamp member and adjustably moving said clamping surface of said clamp member into clamp force transmitting engagement with said lower clamp surface of said second lateral rail projection.

13. The accessory clamp mechanism of claim 12, comprising:

a keeper member preventing separation of said clamp retainer member and said clamp member from said clamp support member.

14. The accessory clamp mechanism of claim 12, comprising:

a clamp alignment receptacle being defined within said retainer opening of said clamp support member;

a clamp alignment projection being defined by said clamp member and being received within said clamp alignment receptacle and establishing predetermined alignment of said clamp member with respect to said clamp support member and said clamp base member;

a keeper receptacle being defined within said clamp member; and a keeper member being located within said keeper receptacle and preventing separation of said clamp retainer member and said clamp member from said clamp support member.

15. The accessory clamp mechanism of claim 12, comprising:

said clamp retainer member being adjustable relative to said clamp support member and said clamp member and adjusting the clamping force of said clamp member with said lower clamp surface of said second lateral projection.

16. The accessory clamp mechanism of claim 12, comprising:

said clamp retainer member being a threaded bolt;

said clamp member being internally threaded and receiving said threaded bolt in threaded engagement therein;

said clamp support member defining a clamp alignment receptacle therein; and said clamp member defining an alignment projection being received within said clamp alignment receptacle.

17. The accessory clamp mechanism of claim 16, comprising:

adjustment indicia being present on said clamp support member and on said threaded bolt and permitting selective adjustment of said clamp retainer member to achieve selective clamping force of said clamp member with said lower clamp surface of said second lateral projection.

18. The accessory clamp mechanism of claim 12, comprising:

said retainer member being a threaded bolt member having threaded engagement with said clamp member;

a keeper receptacle being defined by said clamp member; and said keeper member being a split washer member supported by said threaded bolt member and being located within said keeper receptacle during all conditions of said clamp member with respect to said clamp support member.

19. An accessory clamp mechanism for releasably securing an accessory mount base to an object, comprising:

a mount rail having first and second lateral rail projections each having oppositely tapered upper and lower clamp surfaces;

a mount base member having oppositely tapered internal clamp surfaces defining a clamp groove receiving said first lateral rail projection therein, said mount base member having a tapered internal clamp surface having surface to surface engagement with said upper tapered upper clamp surface of said second lateral rail projection;

a clamp support member projecting laterally from said mount base member and defining a clamp retainer opening;

a clamp member having a tapered clamping surface positioned for clamping engagement with said lower clamp surface of said second lateral rail projection, said clamp member defining an internally threaded opening and defining a keeper receptacle;

a clamp retainer bolt member extending through said clamp retainer opening and having force transmitting threaded engagement with said clamp member and upon rotation achieving clamping and loosening of said clamp member and adjustably moving said clamping surface of said clamp member to and from clamp force transmitting engagement with said lower clamp surface of said second lateral rail projection; and a keeper member engaging said clamp retainer bolt member and being located within said keeper receptacle during all conditions of said clamp member with respect to said clamp support member.

20. The accessory clamp mechanism of claim 19, comprising:

a pivot reaction member being located on said clamp member and having pivot reaction contact with said clamp support member; and upon tightening of said clamp retainer bolt relative to said clamp member said pivot reaction member enhancing force transmitting engagement of said clamp member with said lower clamp surface of said second lateral projection.

\* \* \* \* \*